US007546529B2

(12) United States Patent
Reynar et al.

(10) Patent No.: US 7,546,529 B2
(45) Date of Patent: *Jun. 9, 2009

(54) METHOD AND SYSTEM FOR PROVIDING ALTERNATIVES FOR TEXT DERIVED FROM STOCHASTIC INPUT SOURCES

(75) Inventors: Jeffrey C. Reynar, Woodinville, WA (US); Erik Rucker, Seattle, WA (US); Paul Kyong Hwan Kim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/902,527

(22) Filed: Jul. 29, 2004

(65) Prior Publication Data

US 2005/0005240 A1    Jan. 6, 2005

Related U.S. Application Data

(63) Continuation of application No. 09/412,822, filed on Oct. 5, 1999, now Pat. No. 6,789,231.

(51) Int. Cl.
*G06F 17/21* (2006.01)
*G06F 17/24* (2006.01)

(52) U.S. Cl. .................. 715/256; 715/255; 715/257; 715/259; 715/260; 704/235; 704/240

(58) Field of Classification Search ............... 715/531, 715/533, 255–257, 259, 260; 704/235, 240
See application file for complete search history.

(56) References Cited

U.S. PATENT DOCUMENTS 5,481,278 A * 1/1996 Shigematsu et al. ......... 345/179
5,502,774 A   3/1996 Bellegarda et al. ......... 382/159
5,659,771 A   8/1997 Golding ....................... 715/533

(Continued)

FOREIGN PATENT DOCUMENTS

EP    0570660 A1    11/1993

OTHER PUBLICATIONS

Masaaki Nagata, Context-based spelling correction for Japanese OCR, ACM International Conference On Computational Linguistics, vol. 2, 1996, pp. 806-811.*

(Continued)

*Primary Examiner*—Joshua D Campbell
(74) *Attorney, Agent, or Firm*—Merchant & Gould

(57) ABSTRACT

A computer-implemented method for providing a candidate list of alternatives for a text selection containing text from multiple input sources, each of which can be stochastic (such as a speech recognition unit, handwriting recognition unit, or input method editor) or non-stochastic (such as a keyboard and mouse). A text component of the text selection may be the result of data processed through a series of stochastic input sources, such as speech input that is converted to text by a speech recognition unit before being used as input into an input method editor. To determine alternatives for the text selection, a stochastic input combiner parses the text selection into text components from different input sources. For each stochastic text component, the combiner retrieves a stochastic model containing alternatives for the text component. If the stochastic text component is the result of a series of stochastic input sources, the combiner derives a stochastic model that accurately reflects the probabilities of the results of the entire series. The combiner creates a list of alternatives for the text selection by combining the stochastic models retrieved. The combiner may revise the list of alternatives by applying natural language principles to the text selection as a whole. The list of alternatives for the text selection is then presented to the user. If the user chooses one of the alternatives, then the word processor replaces the text selection with the chosen candidate.

21 Claims, 11 Drawing Sheets

U.S. PATENT DOCUMENTS

| | | | |
|---|---|---|---|
| 5,680,511 A | 10/1997 | Baker et al. | 395/2.66 |
| 5,852,801 A | 12/1998 | Hon et al. | 704/244 |
| 5,864,805 A | 1/1999 | Chen et al. | 704/235 |
| 6,161,083 A | 12/2000 | Franz et al. | 704/4 |
| 6,182,028 B1 | 1/2001 | Karaali et al. | 704/9 |
| 6,195,637 B1* | 2/2001 | Ballard et al. | 704/235 |
| 6,424,983 B1 | 7/2002 | Schabes et al. | 715/533 |
| 6,457,031 B1* | 9/2002 | Hanson | 715/531 |
| 6,789,231 B1* | 9/2004 | Reynar et al. | 715/533 |

OTHER PUBLICATIONS

Konno, A. et al., "Postprocessing Algorithm Based on a Probabilistic and Semantic Method for Japanese OCR," Document Analysis and Recognition, Proceedings of the Second International Conference on Tsukuba Science City, Japan, *IEEE Comput. Soc.,* Oct. 20-22, 1993, pp. 646-649.

Microsoft Word 97, 1996 Microsoft Corporation, application screenshots 1-11.

Damerau, Fred J., technique for computer detection and correction of spelling arrors, ACM Mar. 1964, vol. 7, Issue 3, pp. 171-196.

* cited by examiner

METHOD AND SYSTEM FOR PROVIDING ALTERNATIVES FOR TEXT DERIVED FROM STOCHASTIC INPUT SOURCES

CROSS REFERENCE TO RELATED APPLICATIONS

This application is a continuation of application Ser. No. 09/412,822, filed Oct. 5, 1999, now U.S. Pat. No. 6,789,231, entitled "Method and System for Providing Alternatives for Text Derived from Stochastic Input Sources," issued Sep. 7, 2004, said patent incorporated herein by reference.

FIELD OF THE INVENTION

The invention relates generally to methods for entering text into a computer and, more particularly, relates to providing alternatives for a text selection derived from multiple stochastic input sources.

BACKGROUND OF THE INVENTION

Computer users have traditionally entered text into word processors through a keyboard and mouse. In recent years, however, word processors have become more sophisticated by allowing users to enter text into them through other input methods, such as speech or handwriting. Although a computer cannot always interpret such input with complete accuracy, a computer can generate a list of text alternatives for the input. Furthermore, the computer can often assign to each alternative a probability that the alternative is the one the user intended. Input that produces such probabilistic results is called "stochastic input," while input that can be accurately determined, such as typed text, is called "non-stochastic input."

Typically, text produced in a word processor from stochastic input must be heavily edited by the user in order to produce the text intended by the user when he or she created the stochastic input. The editing process has been simplified by allowing the user to select text created from stochastic data and request alternatives for the text selection. In response, the computer can provide the user with alternatives for the text selection through a graphical user interface. If the user chooses one of the alternatives, the computer replaces the text selection with the selected alternative.

Suppose that after a user creates text in a word processor by providing the word processor with stochastic input, such as speech, the user then edits the text. The user may, for example, replace a word of the text with a new word typed into the computer with a keyboard. Current word processors do not incorporate typed text edits into the alternatives they provide for an edited text selection. Thus, there is a need in the art for a method of providing alternatives to edited text derived from stochastic input.

Another problem occurs if the user attempts to request alternatives for a text selection spanning multiple stochastic input sources. For instance, the user may request alternatives for a text selection containing a word based on handwriting input and a word based on speech input. Current word processors are not capable of providing meaningful alternatives for such a text selection. Thus, there is also a need in the art for a method of providing alternatives for a text selection derived from multiple stochastic input sources.

An input method editor (IME) is another word processor input method that produces stochastic data. Generally, an IME converts input into foreign language text. The input into an IME may, for example, be typed text entered into the computer through a keyboard and mouse. An IME is especially useful for creating ideograms in Asian and other languages. Because there are many more ideograms in such languages than there are keys on a keyboard, entering a particular ideogram into the computer typically requires multiples keystrokes, which the IME interprets as a composed character.

In a typical IME, a user may type in English characters defining a phonetic spelling for a desired Chinese character. Since many Chinese characters have similar pronunciations, the typed phonetic spelling may represent any one of a number of different Chinese characters. The IME then provides the user with the most probable candidates corresponding to the typed phonetic spelling so that the user can choose the correct one.

Programmers have previously recognized the value of providing speech input into an IME. This is done by first converting the speech into text, which is then used as input into the IME. As has already been explained, however, the interpretation of speech is stochastic in nature. Hence, the text produced by the speech interpreter may not be the text that was intended by the user. If incorrect text is used as input into the IME, the results produced by the IME are likely to be poor. Accordingly, when speech is used as input into an IME, the program interpreting the speech data typically allows the user to first correct the text produced by the speech interpreter before inputting that text into the IME. When the IME produces foreign language translations of the text, the user may again choose the desired alternative because the result of an IME is also stochastic in nature. Requiring the user to edit the results at two different stages of the process can be inefficient and inconvenient. Thus, there is a further need in the art for an improved method of handling speech input to an IME.

SUMMARY OF THE INVENTION

The present invention meets the needs described above in a stochastic input combiner that facilitates the editing of text. The invention does this by providing alternatives for a text selection made by the user, even where that text selection is derived from multiple input sources, one or more of which can be stochastic in nature.

The stochastic input combiner provides the alternatives to the user in list form through a graphical user interface. The user can then choose one of the alternatives to replace the text selection the user has highlighted for editing. This can often be quicker than requiring the user to think of alternatives on his or her own and then make changes accordingly using a keyboard and mouse. If the user does not find an alternative the user likes for the text selection, the user can edit the text selection using the keyboard and mouse. In response, the stochastic input combiner can provide an updated list of alternatives that incorporate the user's changes. Often, the user need only partially edit the text selection before the stochastic input combiner produces an alternative the user likes, so the stochastic input combiner again improves editing efficiency.

The stochastic input combiner may also provide the advantage of a natural language model. Such a model may analyze the text selection as a whole using natural language principles in order to provide a better list of alternatives for the text selection. This, too, improves the user's editing efficiency.

Generally described, the present invention includes a method for correcting text. The user first enters text into the computer, perhaps using multiple stochastic input sources. The user may also use a keyboard and mouse to enter text into the computer.

Keyboard/mouse entry of text is an example of an input source which is non-stochastic, meaning that the text intended to be entered through the source can be determined with complete accuracy. On the other hand, a stochastic input source is one that converts input into a list of alternatives, each having less than 100% probability of being the correct alternative. Because speech cannot always be interpreted by a computer with complete accuracy, a speech recognition unit is an example of a stochastic input source which converts speech input into a list of text alternatives. Other examples of a stochastic input source include a handwriting recognition unit and an input method editor (IME). Where an input source for a text component is stochastic, the most likely alternative for the text component is generally used to represent the text component in the text selection.

Once the user enters text into the computer, the user can begin the correction process by making a text selection of a portion of the text the user entered. This text selection can include multiple text components. Such a text component can be a subset of the text selection that the user entered through a single input source. The user may have entered different text components within the text selection using different input sources, and the user may have entered one or more of the text components with a stochastic input source.

Once the user makes a text selection, the user may enter a command to display alternatives for the text selection as a whole. The stochastic input combiner then parses the text selection into its text components and retrieves a stochastic model representing the alternatives for a text component originating from a stochastic input source. This stochastic model may include a list of the alternatives for the text component together with the probabilities associated with the alternatives. Alternatively, the stochastic model may include a lattice.

The stochastic input combiner then combines the stochastic model retrieved with other text components to produce a list of alternatives for the text selection as a whole. The stochastic input combiner then displays this list of alternatives for the text selection on a display device, such as a monitor. The user may then select one of the displayed alternatives. In that case, the selected alternative replaces the text selection.

The stochastic input combiner may also utilize a natural language model. In this alternative, the stochastic input combiner may combine the stochastic models for each stochastic text component to produce an interim list of alternatives for the text selection that the combiner provides to the natural language model. The natural language model forms a revised list of alternatives by reevaluating the interim list of alternatives based on natural language principles applied by the natural language model to the text selection as a whole. The natural language model may also add new alternatives to the revised list of alternatives that are not found in the interim list. After the natural language model returns the revised list of alternatives to the stochastic input combiner, the stochastic input combiner provides the revised list of alternatives for display.

In another alternative, a series of stochastic input sources creates a stochastic text component. This means that at least one stochastic input source produces a stochastic result that serves as input into a second stochastic input source. Typically, the first stochastic input source of the series requires user input, while subsequent stochastic input sources in the series receive an alternative produced by the previous stochastic input source as input. An example of this is a speech recognition unit that produces text used as input into an IME. When stochastic input sources in series produce a stochastic text component, the stochastic input combiner can produce a series stochastic model that contains alternatives for the stochastic text component and accurate probabilities for those alternatives that account for the likelihood of the inputs into each stochastic input source in the series. This process eliminates any need for the user to choose a single alternative produced by a stochastic input source to use as input into a subsequent stochastic input source.

To produce a series stochastic model for a text component derived from a series of stochastic input sources, the stochastic input combiner first submits to the first stochastic input source in the series the user input intended for that stochastic input source. By processing the user input, the first stochastic input source produces a stochastic result. The stochastic result that the first stochastic input source produces has multiple alternatives, and the stochastic input combiner selects that stochastic result. By using each alternative of the selected stochastic result as input into the second stochastic input source to produce a stochastic result for the second stochastic input source, the stochastic input combiner produces multiple stochastic results, each stochastic result having multiple alternatives, for the second stochastic input source. If any stochastic result for the second stochastic input source does not contain an "n-best" alternatives list, the stochastic input combiner converts that stochastic result into an "n-best" alternatives list because converting all stochastic results into the same format simplifies the process of combining them. The stochastic input combiner then combines the stochastic results for the second stochastic input-source to create a totalized alternatives list for the second stochastic input source. If there are only two stochastic input sources in the series, then the totalized alternatives list may serve as the stochastic model for the text component resulting from the series.

The stochastic input combiner may also be functional for expanding the scope of correction for a text selection received from a user to a larger text unit. To do this, the stochastic input combiner submits the text selection to a correction scope model to make the determination of whether the scope of correction should be adjusted. In response to submitting the text selection, the stochastic input combiner receives from the correction scope model a text unit that includes the text selection and at least one adjacent word. Using the text unit, the stochastic input combiner can then produce a list of alternatives for the text unit and display those alternatives on a display device.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
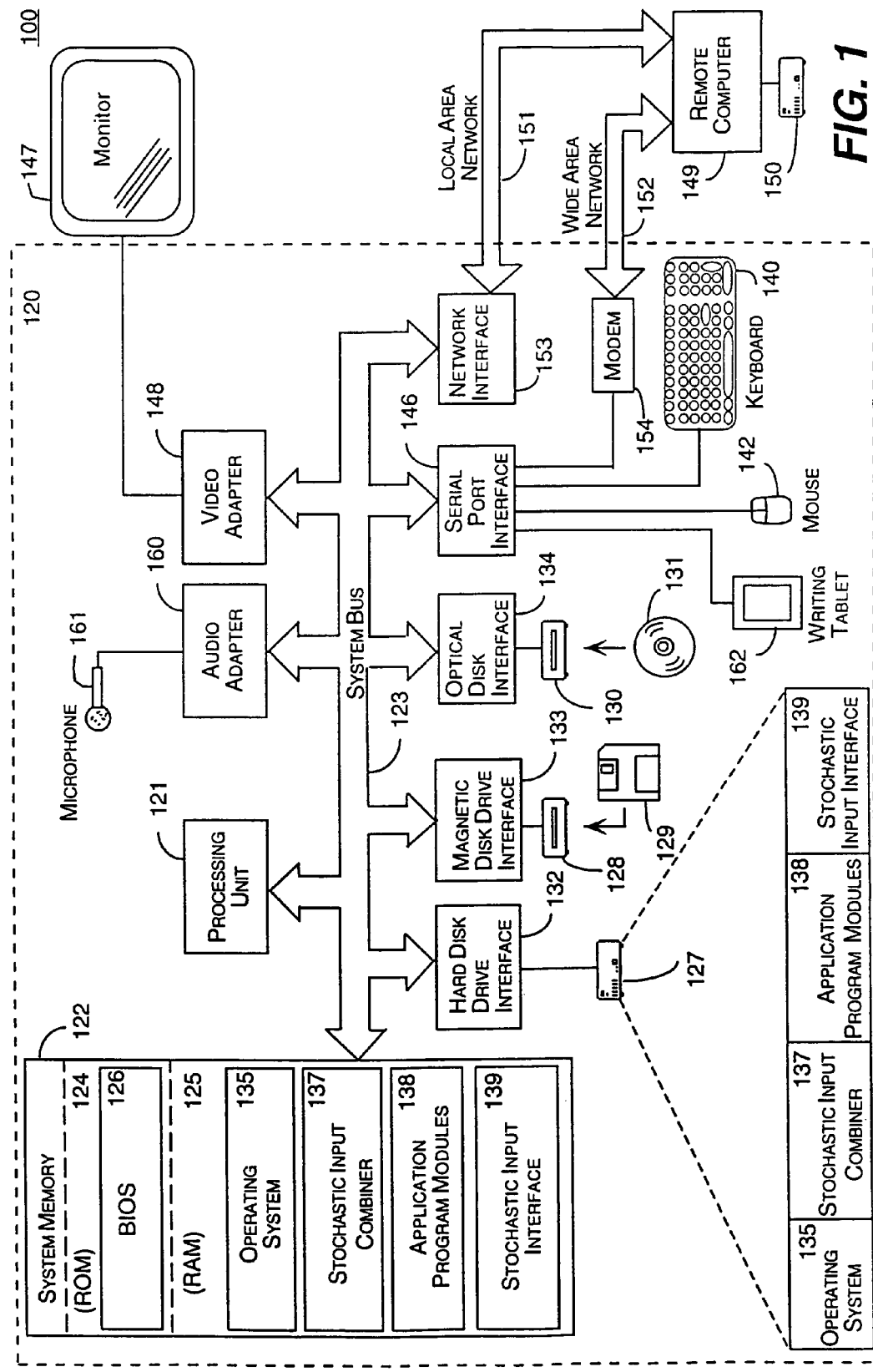
FIG. 1 is a block diagram illustrating the operating environment for an exemplary embodiment of the present invention.

The present invention is typically embodied in a word processor that can receive input from multiple sources, each of which can be a non-stochastic input source or a stochastic input source. Keyboard/mouse entry of text is an example of an input source which is non-stochastic, meaning that the computer can determine the text the user intended with complete accuracy. On the other hand, a stochastic input source is one that converts input into a stochastic result. A stochastic result is one having multiple alternatives, each having less than 100% probability of being the correct alternative. An example of a stochastic input source is a speech recognition unit, which converts speech input into a list of text alternatives since a computer cannot always interpret speech with complete accuracy. Other examples of a stochastic input source are a handwriting recognition unit and an input method editor (IME).

The word processor is functional for allowing the user to select a section of text and to request alternatives for that selection. If the computer has created the text selection from one or more stochastic input sources, there will be alternatives for the text selection. After the word processor determines alternatives for the text selection, the word processor displays the alternatives through a graphical user interface. If the user chooses one of the alternatives for the text selection, then the word processor replaces the text selection with the chosen candidate.

After examining the list of alternatives that the word processor provides, the user may not find an acceptable alternative for the text selection. Hence, the word processor may allow the user to edit the text selection using a keyboard and mouse. The user may, for example, change one of the words in the text selection. In that case, the word processor may then revise the list of alternatives to incorporate the edit and provide the revised list of alternatives to the user. If the user chooses one of the revised alternatives for the text selection, then the word processor replaces the text selection with the chosen alternative.

A program module called a stochastic input combiner is typically responsible for producing the alternatives for a text selection. The stochastic input combiner does this by parsing the text selection into smaller text components derived from no more than one stochastic input source. For each stochastic text component, the stochastic input combiner then retrieves a stochastic model representing the alternatives for the text component. Then, the stochastic input combiner can combine the stochastic models retrieved with other text components to produce a list of alternatives for the text selection as a whole.

The stochastic input combiner can be part of the word processing application. Alternatively, the stochastic input combiner can be a separate utility that is part of the operating system. The combiner could also be a separate program that interfaces with the word processor but that is not part of the operating system.

To improve the list of alternatives the word processor offers for a text selection, the word processor may use a natural language model. The natural language model may apply natural language principles to the text selection as a whole to reevaluate the likelihood of the alternatives in the alternatives list produced by the stochastic input combiner and to add new alternatives to the alternatives list. Alternatively, the natural language model may apply natural language principles to individual text components to improve the stochastic models that the stochastic input combiner uses to produce the alternatives list.

A text component is occasionally derived from a series of stochastic input sources. This means that at least one stochastic input source produces a stochastic result that serves as input into a second stochastic input source. The first stochastic input source in the series typically receives user input, while the last stochastic input source in the series produces the alternatives for the text component. The stochastic input combiner can derive a series stochastic model containing alternatives for such a text component without requiring the user to select a single alternative result for each stochastic input source in the series as input for the subsequent stochastic input source.

To derive a series stochastic model for a text component, the stochastic input combiner first selects the user input that ultimately produced the text component. The stochastic input combiner then submits the selected user input to the first stochastic input source in series order. The stochastic input combiner then submits each alternative produced by the first stochastic input source as input into the subsequent stochastic input source in series order. Because the subsequent stochastic input source produces a stochastic result from each alternative submitted to it, the stochastic results of the subsequent stochastic input source must be combined into a totalized candidate list. If there is yet another stochastic input source in the series, the stochastic input combiner submits each candidate of the totalized candidate list as input into that next stochastic input source. The totalized candidate list that the last stochastic input source of the series produces in this fashion is the series stochastic model.

Often, stochastic input sources make an error which spans multiple words. During the correction process, a user may not notice the full extent of that error. For example, if the user dictates the word "recognize," the speech recognition engine might conclude that the most likely interpretation of the speech input is "wreck a nice." While editing, the user might see the word "wreck" and request alternatives only for that word because the user did not notice that the following words were also incorrect (i.e., "a nice").

If a user makes a text selection that does not include adjacent words that are incorrect because of a related error and if the word processor only uses the user's text selection to produce an alternatives list, none of the alternatives offered for the text selection may be the text the user intended at the time of input. Similarly, replacing the text selection with an alternative chosen by the user from the alternatives list would leave the incorrect adjacent words in the text.

To eliminate these disadvantages, the stochastic input combiner may submit the text selection to a correction scope model which determines if the scope of correction should be expanded. In the "recognize" example, an appropriate text unit for correction would be "wreck a nice." To make this determination, the correction scope model may draw on information included in a natural language model, models of likely errors, and models tied to the input methods used to produce the text in the word processor. The models associated with the input method may include acoustic models for speech recognition, handwriting models for handwritten input, and vision-based models for recognizing sign language or other gestures.

If the correction scope model determines that the scope of correction should be adjusted, the correction scope model sends Exemplary Operating Environment FIG. 1 and the following discussion are intended to provide a brief and general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. A microphone 161 may be used to enter audio input, such as speech, into the computer system 120. A user may enter graphical information, such as drawings or handwriting, into the computer system by drawing the graphical information on a writing tablet 162 using a stylus. The computer system 120 may include additional input devices (not shown), such as a joystick, game pad, satellite dish, scanner, touch screen/stylus, or the like. The microphone 161 can be connected to the processing unit 121 through an audio adapter 160 that is coupled to the system bus. The other input devices are often connected to the processing unit 121 through a serial port interface 146 that is coupled to the system bus, but may be connected by other interfaces, such as a game port or a universal serial bus (USB).

A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. The invention may conveniently be implemented in one or more program modules, such as a stochastic input combiner program module 137 and a stochastic input interface program module 139, each of which is based upon the methods described in the detailed description.

Figure 2:
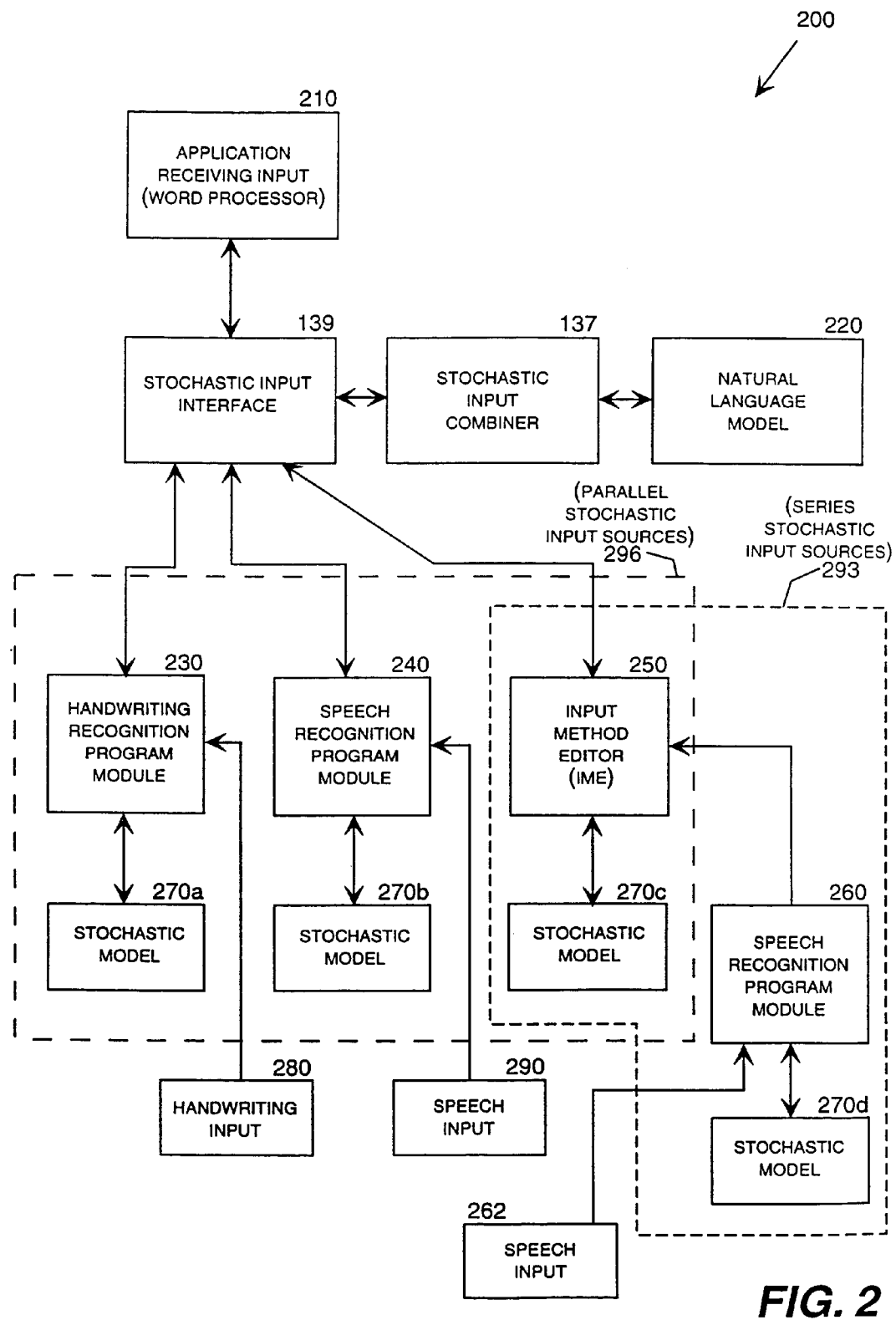
FIG. 2 is a block diagram providing an overview of the program modules of a multi-source data processing system.

The application program modules 138 may comprise a variety of applications used in conjunction with the present invention, some of which are shown in FIG. 2. The purposes of and interactions between some of these program modules are discussed more fully in the text describing FIG. 2. These include a word processor program 210 (such as WORD, produced by Microsoft Corporation of Redmond, Wash.), a handwriting recognition program module 230, a speech recognition program module 240, and an input method editor (IME) 250.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Overview of Program Modules

FIG. 2 provides an overview of the program modules of a multi-source data processing system 200. Generally, the program modules shown in FIG. 2 enable a user to enter text into an application 210, such as a word processor, using both stochastic and non-stochastic input sources. Typical stochastic input sources include a handwriting recognition program module 230, speech recognition program module 240, input method editor (IME) 250, and speech recognition program module 260. A keyboard 140 is a typical source of non-stochastic data. Once the user enters text into the word processor 210 through one or more of these input sources, the user may then select a section of text and request a candidate list of alternatives for that text selection. The text selection may contain input from multiple stochastic and non-stochastic input sources. As long as the text selection is derived from at least one stochastic input source, there will be alternatives for the text selection. The program modules can produce this candidate list and present them to the user through a graphical user interface. If the user chooses one of the candidates, the text selection is replaced with the chosen candidate. The operation of stochastic input sources 230, 240, 250, and 260 are now discussed in turn.

The handwriting recognition program module 230 receives handwriting input 280 from the user. The user may generate the handwriting input 280 by writing on the writing tablet 162 with a stylus. Alternatively, the user may generate handwriting input 280 using other devices. For instance, the user may write on the monitor 147 with a mouse 142, or the user may write on a touch screen using a stylus. After input, the handwriting input 280 is preferably directed to the handwriting recognition program module 230 by a writing tablet driver module in the operating system 135.

As handwriting is often difficult for a computer to interpret, the handwriting recognition program module 230 cannot always decipher the handwriting input 280 with complete accuracy. The best the program module 230 can do is to generate alternatives for the handwriting input 280 and assign a probability that each alternative is the correct one. By definition, then, the handwriting recognition program module 230 generates a stochastic result. The stochastic model 270a includes a data structure containing the stochastic data produced by processing handwriting input 280 with the handwriting recognition program module 230.

Although any data structure capable of storing stochastic data can comprise a stochastic model 270, two useful structures for doing so are a lattice and an "n-best" alternatives list. A lattice is a structure that is well known to those skilled in the art, so a complete description will not be given. Briefly, however, a lattice stores words or phrases produced by a stochastic input source in nodes. Because each word or phrase is stochastic data, the node also stores a probability assigned to the associated word or phrase. Using methods well known to those skilled in the art, the lattice can be traversed in order to produce likely alternatives for any section of text represented by the stochastic data. Furthermore, lattices representing adjacent pieces of text can be combined into a metalattice through a process known as concatenation. The metalattice can then be traversed to produce alternatives for the adjacent pieces of text.

Alternatively, stochastic data may be represented by a list of the n-best alternatives and their associated probabilities. For any given word or phrase, an n-best alternatives list may be produced from a lattice representing the word or phrase.

The speech recognition program module 240 works like the handwriting recognition program module 230, except that it receives speech input 290 from the user through a microphone 161 run by a microphone driver module in the operating system 135. Speech is often difficult to interpret because many words that sound alike have different meanings and spellings, so the speech recognition program module 240 also produces a stochastic result. The stochastic model 270b stores the data structure containing the stochastic data produced by processing speech input 290 with the speech recognition program module 240.

An input method editor (IME) 250 also generates stochastic data. Generally, an IME 250 converts input into foreign language text. The input into an IME 250 may, for example, be typed text entered into the computer through a keyboard 140 and mouse 142. The stochastic model 270c includes a data structure containing the stochastic data produced by the IME 250.

An IME 250 is especially useful for creating ideograms in Asian and other languages. Because there are many more ideograms in such languages than there are keys on a keyboard, entering a particular ideogram into the computer is problematic without an IME 250. In a typical IME 250, a user types in English characters a phonetic spelling for a desired Chinese character. Since many Chinese characters have similar pronunciations, the typed phonetic spellings may represent any one of a number of different Chinese characters, and the IME 250 produces a stochastic result. The IME 250 then provides the user with the most probable candidates intended by the typed phonetic spelling so that the user can choose the correct one.

The stochastic results produced by one stochastic input source may serve as stochastic input to a second stochastic input source. When this is the case, the stochastic input sources are "series stochastic input sources," and the stochastic input sources can be described as configured "in series." This is illustrated by the configuration 293 of program modules, which also demonstrates another embodiment of an IME 250.

In this embodiment, English speech input 262 may be entered into the computer and used to produce Japanese text. The speech 262 is first submitted to a speech recognition program module 260. In operation, the speech recognition program module 260 functions much like the speech recognition program module 240, but it is illustrated as a distinct unit because it may have a different speech interpretation engine. For example, the speech recognition program module 260 may interpret a different language than the speech recognition program module 240. The stochastic model 270d includes a data structure containing the stochastic data produced by processing speech input with the speech recognition program module 260.

In an English speech/Japanese IME example, the speech recognition program module 260 may produce English text alternatives from the spoken English words and store them in the stochastic model 270d. One or more of the English language text alternatives stored in the stochastic model 270d can then be used as input into the IME 250, which translates the English language text input into Japanese characters. Each alternative input into the IME 250 produces a separate stochastic result, though it should be appreciated that there may be overlap between the alternatives forming the stochastic results of two distinct inputs into the IME 250.

Though the arrow in FIG. 2 from the speech recognition program module 260 to IME 250 illustrates that the speech recognition program module is a stochastic input source for the IME 250, it should be understood that the two program modules may not interface directly. Thus, for example, stochastic input from speech recognition program module 260 to IME 250 may travel through an interface program module, such as stochastic input interface 139, to which each stochastic input source is directly connected.

A stochastic input interface 139 serves as a conduit for stochastic data between an application 210 that is to receive stochastic data and a stochastic input source, such as handwriting recognition program module 230, speech recognition program module 240, or IME 250. One advantage of having a stochastic input interface 139 as a conduit for stochastic data is that it simplifies communication between the application 210 receiving the stochastic data and the stochastic input sources. That is, the application only needs to know how to communicate with the stochastic input interface instead of all possible stochastic input sources. The application 210 that is to receive stochastic input is a word processor in an exemplary embodiment of the present invention. However, the application 210 could also be a spreadsheet, browser, electronic mail program, music transcription program, CAD program, presentation software (such as PowerPoint, produced by Microsoft Corporation of Redmond, Wash.), operating system, or other software program.

In the word processor embodiment, the word processor 210 receives, through stochastic input interface 139, text representing the most likely alternative from each stochastic input source used to enter data into the word processor. In addition to transmitting data into the word processor 210 through multiple stochastic input sources, the user may also enter typical non-stochastic data into the word processor, such as by typing on a keyboard 140. The word processor 210 combines all this source data into a multi-source text string that is presented to the user. Although the word processor 210 does not indicate to the user the source of each word of the text, the word processor nonetheless maintains a record of the source of each component of the text.

The word processor 210 is also functional for allowing the user to identify a section of text and to request alternatives for that selection. If the text selection is derived from one or more stochastic input sources, there will be alternatives for the text selection. The word processor 210 can request a candidate list of alternatives from the stochastic input interface 139 by providing it with the text selection and the sources of each of the components of that text selection. After the request is processed, the stochastic input interface 139 provides the word processor 210 with a candidate list for the entire text selection. The word processor 210 provides the candidate list to the user through a graphical user interface. If the user chooses one of the alternatives for the text selection from the candidate list, then the word processor replaces the text selection with the chosen candidate.

In order to process the request for a candidate list of alternatives for a text selection, the stochastic input interface 139 transmits the request to the stochastic input combiner 137. By communicating with the stochastic input sources through the stochastic input interface 139, the stochastic input combiner 137 can retrieve information about the stochastic models 270 needed to produce the candidate list for the text selection.

To produce the candidate list, the stochastic input combiner 137 may optionally consult a natural language model 220. To do so, the combiner 137 first produces an interim candidate list of alternatives for the text selection using the information retrieved from the stochastic models 270. After the combiner 137 provides the interim candidate list to the natural language model 220, the natural language model analyzes the interim candidate list using clues such as grammar, the overall meaning of a section of text, and the probability of various word sequences. Based upon this analysis, the natural language model 220 produces additional alternatives for the candidate list and reevaluates the probabilities of those alternatives in the interim candidate list. The methods used to produce a candidate list of alternatives for a text selection will be described with reference to FIGS. 3-9.

As shown in FIG. 2, stochastic input sources 230, 240, and 250 can each provide stochastic data to word processor 210 without first filtering their stochastic data through another stochastic input source. In other words, stochastic input sources 230, 240, and 250 can each directly (through stochastic input interface 139) transmit stochastic data to the word processor 210, and stochastic data from each source can be incorporated into the same word processing document. For this reason, they are "parallel stochastic input sources" 296, and these stochastic input sources may be described as configured "in parallel."

Although the various program modules have been described separately, one skilled in the art should recognize that the modules could be combined in various ways and that new program modules could be created to accomplish similar results. In particular, the stochastic input combiner 137 and the natural language model 220 could reside in the stochastic input interface 139, and all three program modules could be part of the operating system 135 or the word processor 210. Also, the combiner 137 and the natural language model 220 could be separate programs that interface with the word processor 210 directly. Similarly, the stochastic input sources 230, 240, 250, and 260 could be stand-alone application program modules 138, or they could be part of the operating system 135.

Graphical Illustration of a Typical Implementation

Figure 3:
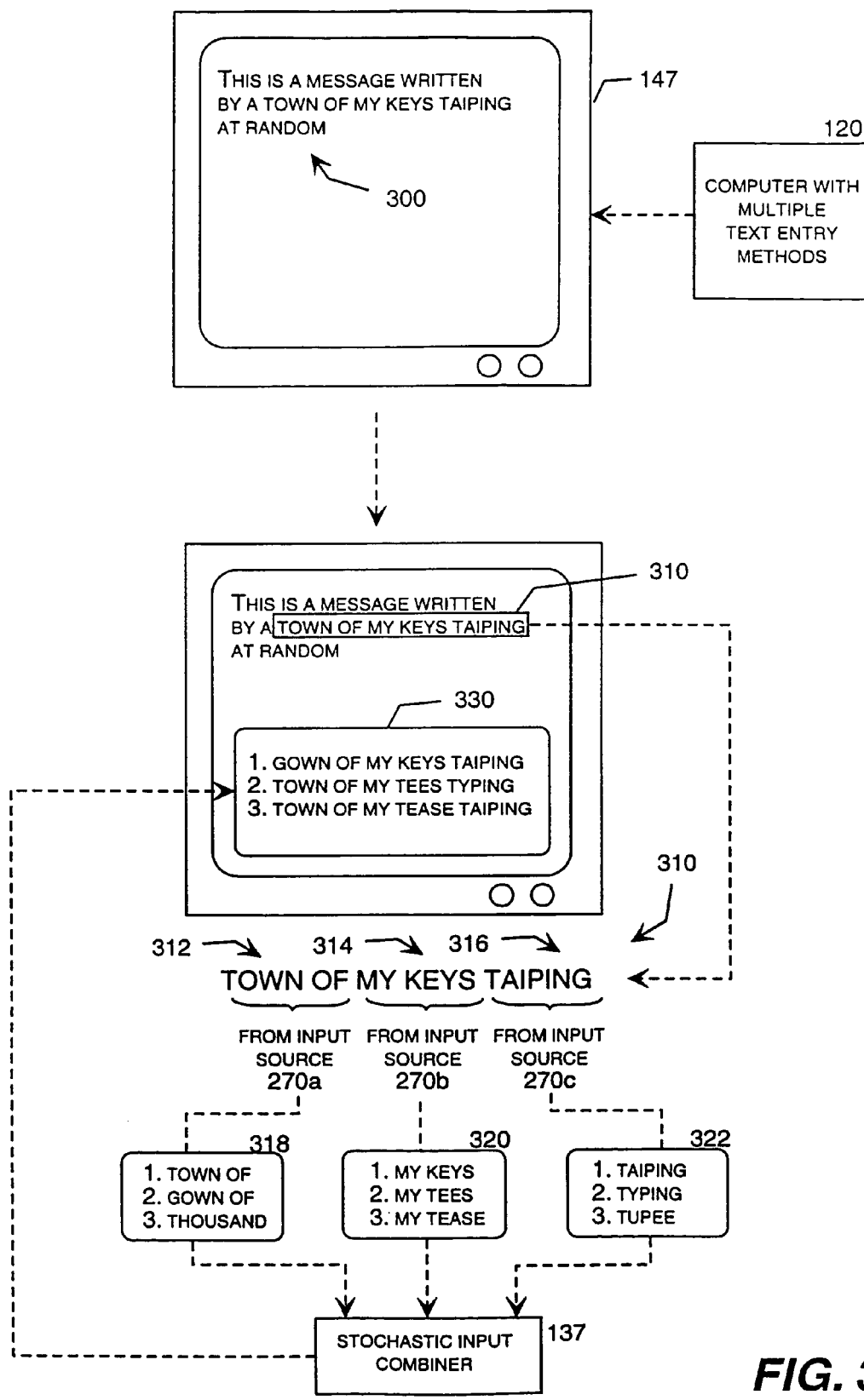
FIG. 3 is a block diagram that illustrates the operation of a typical embodiment of the present invention.
Figure 4A:
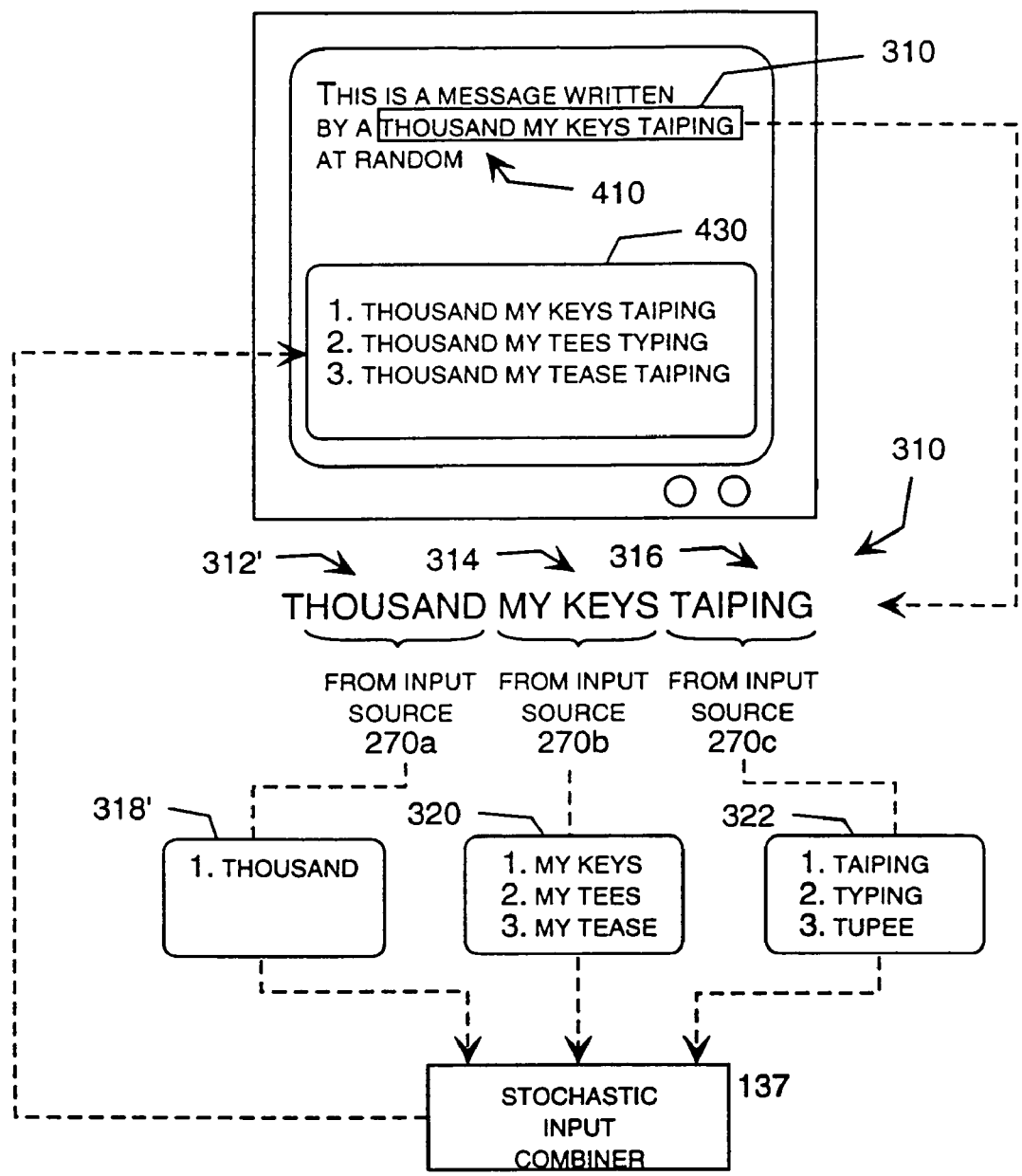
FIGS. 4A-4B are block diagrams that illustrate the operation of an embodiment of the present invention that allows the user to edit a text selection.
Figure 4B:
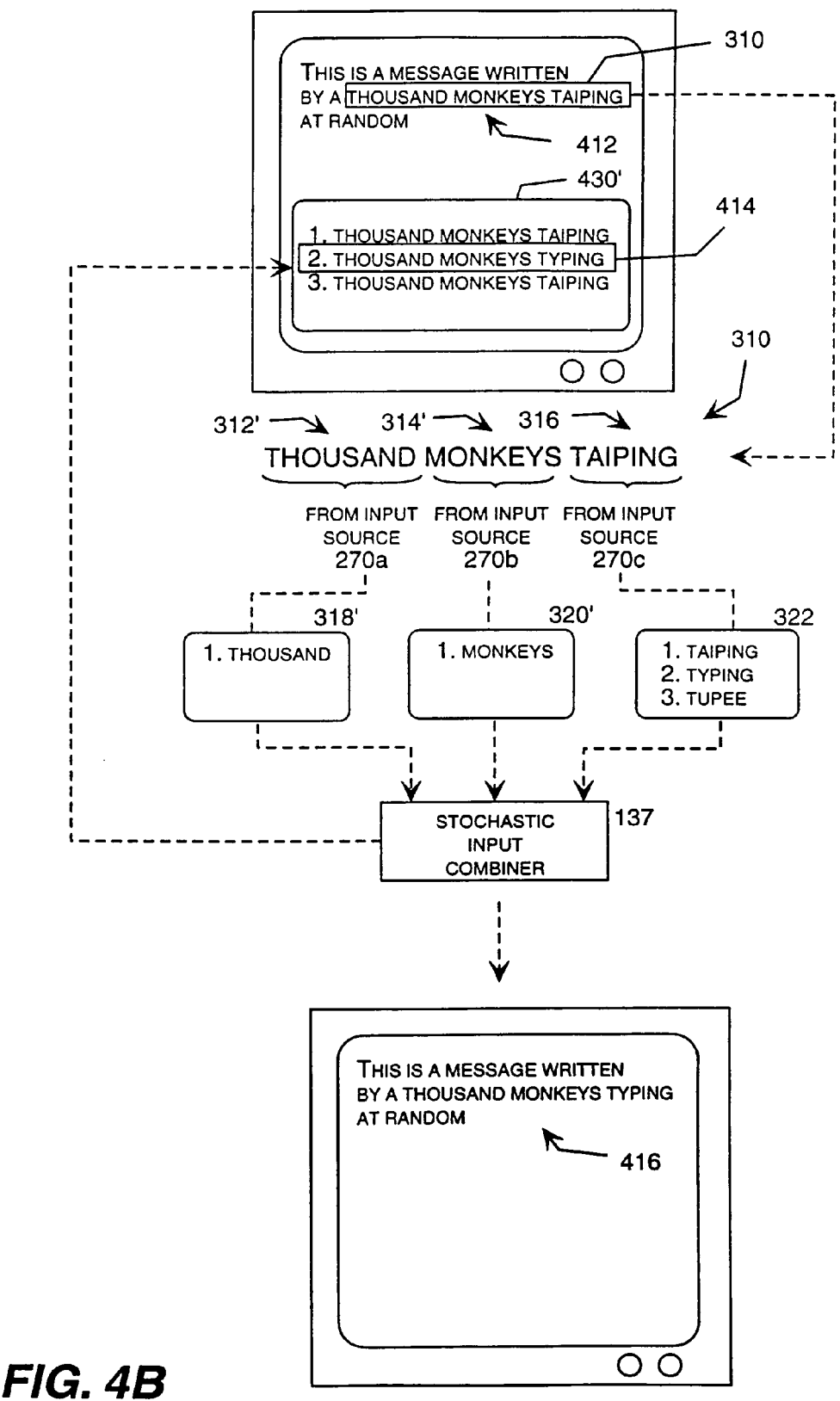
Figure 5:
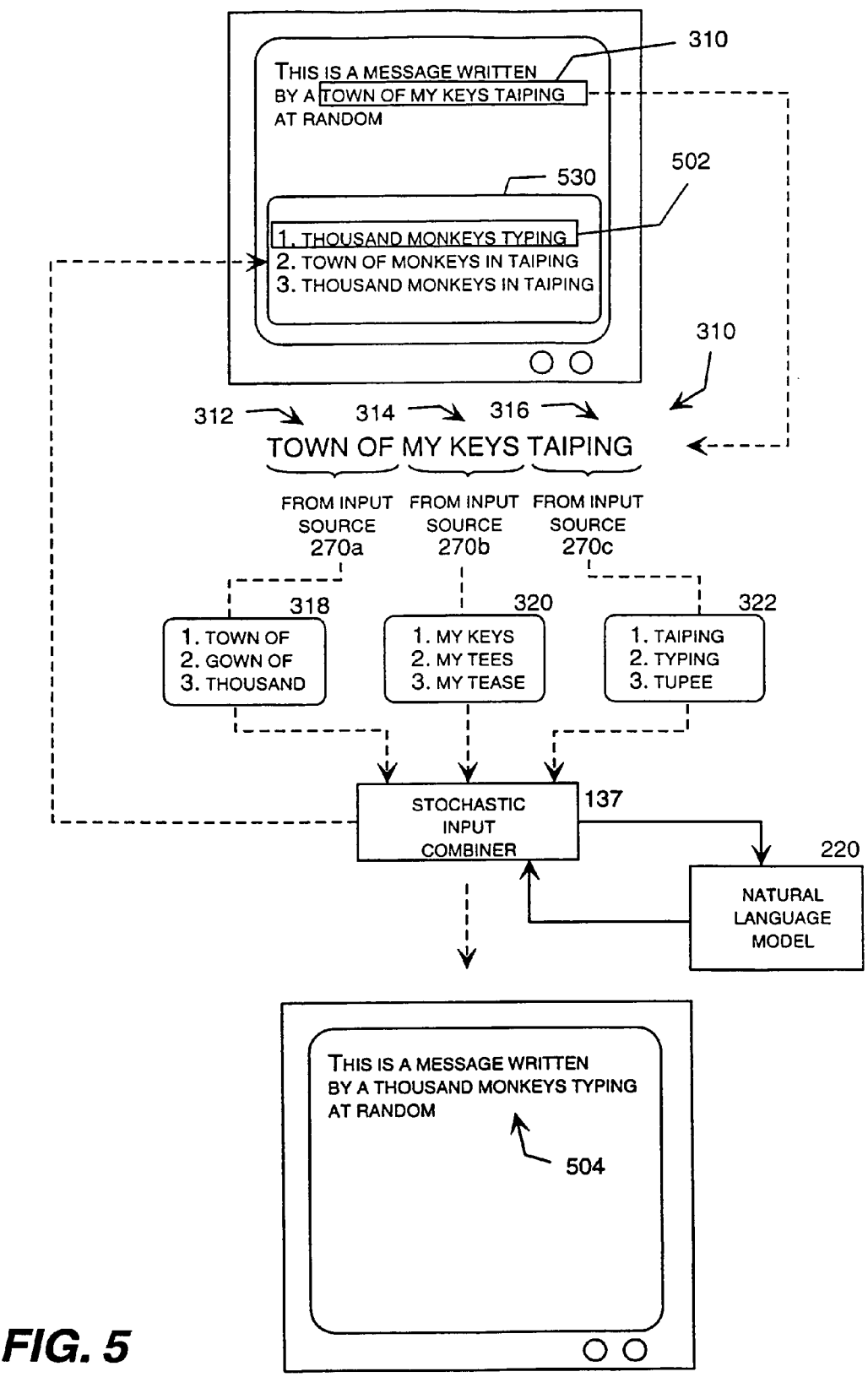
FIG. 5 is a block diagram that illustrates another embodiment of the present invention in which a natural language model is operative.

FIGS. 3-5 illustrate what the user sees and does in a typical implementation of the present invention. Furthermore, these figures show the functionality of the stochastic input combiner 137 and the natural language model 220.

In FIG. 3, a computer 120 with multiple text entry methods accepts input from a user and transmits that input to an application 210, such as a word processor. The computer converts that input into a text string 300, which it displays on monitor 147. In this example, the user intended to produce the text "THIS IS A MESSAGE WRITTEN BY A THOUSAND MONKEYS TYPING AT RANDOM." However, the computer interpreted the stochastic input as "THIS IS A MESSAGE WRITTEN BY A TOWN OF MY KEYS TAIPING AT RANDOM" to produce text 300.

Once the text 300 is displayed, the user may make a text selection 310 by highlighting a portion of the text. The text selection 310 in FIG. 3 has three text components 312, 314, and 316. Each of the text components 312, 314, and 316 comes from a different stochastic input source. Thus, for example, text component 312 may be one of the alternatives produced by processing handwriting input 280 with the handwriting recognition program module 230. The alternatives produced by this stochastic input source are stored in the stochastic model 270a. The alternatives list 318 is a list of the alternatives for text component 312 stored in the stochastic model 270a. Furthermore, the computer has chosen "TOWN OF" for text component 312 because the computer determined that that is the most likely alternative in alternatives list 318 for the handwriting input 280 that was used to produce the text component 312. As shown by alternatives list 318, however, the computer also recognizes that "GOWN OF" and "THOUSAND" are possible alternative phrases for text component 312.

Similarly, speech recognition program module 240 produces the stochastic result stored in stochastic model 270b by processing speech input 290. The alternatives list 320 contains the alternatives stored in stochastic model 270b for text component 314. "MY KEYS" has been selected for text component 314 because it is the most likely alternative.

Likewise, text component 316 "TAIPING" comes from yet a third stochastic input source. This stochastic input source stores its alternatives in stochastic model 270c, and the alternatives are represented in list form in alternatives list 322.

The stochastic input combiner 137 forms various combinations of alternatives from alternatives list 318, 320, and 322. The stochastic input combiner 137 then produces a ranked list of the various combinations it has produced based on its calculation of the probability that each combination is the one intended by the user for text selection 310. The top ranked alternatives for text selection 310 are then displayed in alternatives list 330 on the monitor 147.

After the alternatives list 330 for the text selection is displayed, the user may choose to edit the text selection, as shown in FIG. 4A. In that figure, the user has made edit 410 by typing the word "THOUSAND" over the words "TOWN OF" from FIG. 3. As a result, text component 312 of text selection 310 is replaced with text component 312'.

Edit 410 may have been accomplished by using a keyboard 140 and a mouse 142. Because such an entry method is non-stochastic in nature, there are no alternatives for text component 312'. This change is reflected in alternatives list 318', which has replaced alternatives list 318 from FIG. 3. The only alternative shown in alternatives list 318' is "THOUSAND."

After the edit is completed, stochastic input combiner 137 again forms various combinations of alternatives from alternatives lists 318', 320, and 322 in order to form alternatives for the edited text selection 310. These alternatives are displayed as alternatives list 430 on monitor 147.

If the user desires a different alternative to replace text selection 310 than the alternatives displayed in alternatives list 430, the user may again edit text selection 310. This is shown in FIG. 4B, with the user making edit 412 by typing the word "MONKEYS" over the phrase "MY KEYS" that appeared in text selection 310 in FIG. 4A. As a result, text component 314', "MONKEYS," replaces text component 314, "MY KEYS." This further results in the replacement of alternatives list 320 with alternatives list 320', which contains only one alternative because an edit is non-stochastic in nature. Once again, the stochastic input combiner 137 combines alternatives from the various alternatives lists 318', 320', and 322 in order to produce alternatives list 430' for text selection 310.

At that point, the user may find an alternative 414 which he wishes to replace text selection 310. If so, he may highlight and choose alternative 414, in which case alternative 414 replaces the text selection 310 to produce new text 416.

FIG. 5 is similar to FIG. 3, except that FIG. 5 illustrates an embodiment of the invention in which the natural language model 220 is operative. As in FIG. 3, a user makes text selection 310 comprised of text components 312, 314, and 316. The stochastic input combiner 137 then forms various combinations of alternatives for the text components to produce an interim list of alternatives for text selection 310. Instead of displaying the most probable alternatives thus derived, the stochastic input combiner 137 then passes the interim list of alternatives for the text selection 310 to a natural language model 220.

The natural language model 220 then re-evaluates the probabilities of the various alternatives in the interim alternatives list based on natural language principles applied by the natural language model to the text selection 310 as a whole. This includes analysis of grammatical and other language clues in the text selection. The natural language model 220 may also form additional alternatives for the text selection 310 not found in the interim list of alternatives provided to the natural language model 220. The natural language model 220 returns to the stochastic input combiner 137 a revised list of alternatives based on the re-evaluated alternatives in the interim alternatives list and the additional alternatives it has produced. The stochastic input combiner 137 then chooses the top ranked alternatives for display in alternatives list 530.

Because of the operation of the natural language model, the alternatives list 530 is hopefully better than alternatives list 330 of FIG. 3. If that is the case, the user may choose an alternative 502 from alternatives list 530 without having to edit the text selection 310. In the example shown in FIG. 5, new text 504 is formed by the user replacing text selection 310 with alternative 502.

Flow Charts for a Typical Implementation

Figure 6:
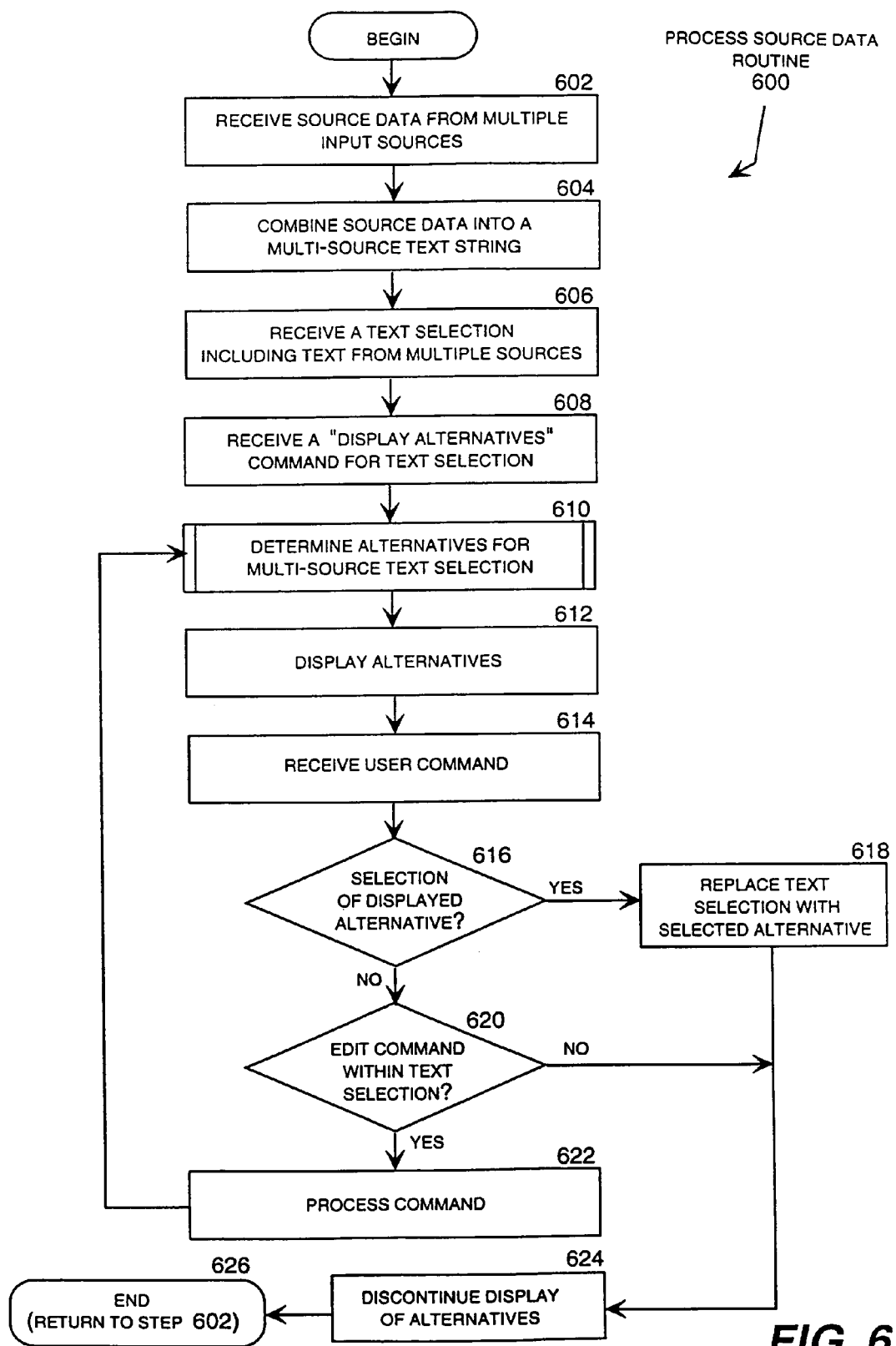
FIG. 6 is a flow chart of the steps in a routine for processing source data from multiple input sources.

FIG. 6 is a flow chart of the steps in a typical routine 600 for processing source data. This routine illustrates the steps that implement the embodiments of the invention described with respect to FIGS. 3-5. The routine 600 begins at step 602 with the word processor receiving source data from multiple input sources. An input source may be a stochastic input source, such as handwriting recognition program module 230, speech recognition program module 240, or input method editor 250. An input source could also be non-stochastic, such as typed data entered using a keyboard 140 and mouse 142. Furthermore, some of the source data may come from two or more stochastic input sources configured in series. If data is derived from stochastic input sources configured in series, each stochastic input source may be counted as a different input source.

After the word processor receives source data from multiple input sources, the word processor combines that data into a multi-source text string in step 604. This means that the word processor creates text corresponding to the source data so that the word processor can display the text on the monitor 147. Furthermore, word processor creates a data structure to keep track of the source of each word of the text.

In step 606, a user may make a text selection including a portion of the displayed text. This text selection may include text from multiple input sources. The user may, for example, make the text selection by depressing a mouse button at the beginning of the text selection, dragging the mouse to the end of the desired text selection, and then releasing the mouse button. Preferably, the word processor highlights the text selection to indicate what has been selected.

In step 608, the word processor receives a "display alternatives" command for the text selection. In response, the word processor determines alternatives for the multi-source text selection in step 610.

In step 612, the word processor displays those alternatives on the monitor 147. The word processor preferably displays the alternatives in probabilistic order through a graphical user interface that allows the user to make a selection from the displayed alternatives. The graphical user interface may appear in a sub-window that the user can move around so as to reveal text hidden by the sub-window.

In step 614, the user gives the word processor a command. Examples of possible commands include the selection of a displayed alternative, an attempt to edit the text selection, or an attempt to make a new text selection by depressing the mouse button to anchor the mouse at a point of the text outside of the text selection.

In step 616, the word processor determines if the user has selected a displayed alternative. If the user has selected a displayed alternative, then step 618 is performed, in which the word processor replaces the text selection with the selected alternative. After step 618, the word processor discontinues the display of alternatives in step 624 before the routine ends at step 626. After step 626, the routine may be repeated by a return to step 602.

Returning to step 616, if the user has not selected a displayed alternative, then step 620 is performed. In step 620, the word processor determines if the user is editing the text within the text selection. If the user is editing the text within the text selection, then the word processor processes that edit in step 622. After the word processor completes the edit, the routine loops back to step 610 to determine new alternatives for the edited text selection.

Returning to step 620, if the user command received in step 614 was not an edit command within the text selection, then the word processor performs step 624. In this case, the user has initiated the creation of a new text selection by depressing the mouse outside of the old text selection. Hence, the word processor discontinues the display of alternatives in step 624 before the routine ends at step 626. Once again, the routine may be repeated by returning to step 602.

Figure 7:
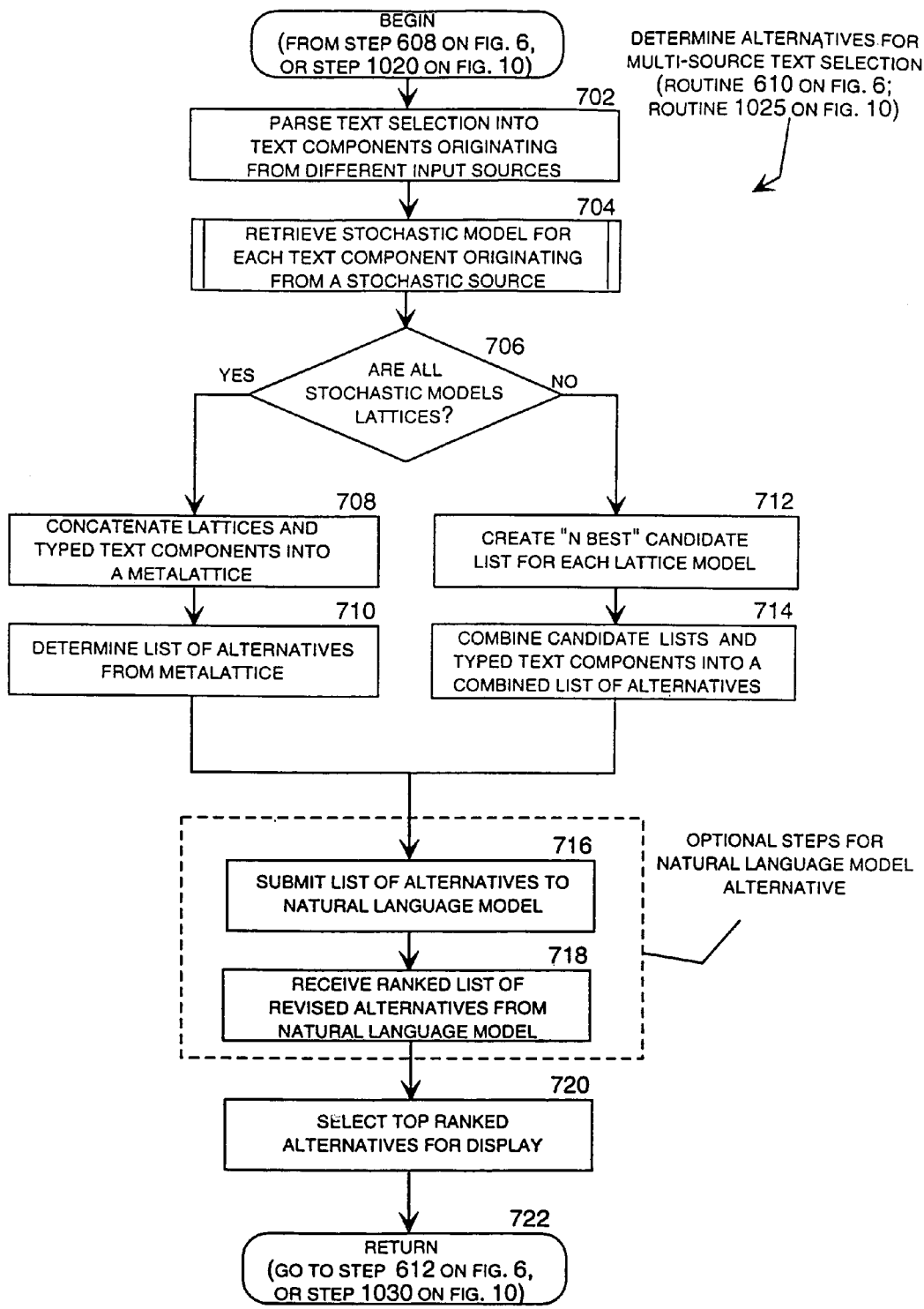
FIG. 7 is a flow chart of the steps in a routine for determining alternatives for a multi-source text selection.

FIG. 7 details the steps of routine 610 from FIG. 6. The routine describes the steps for determining alternatives for a multi-source text selection. Typically, a stochastic input combiner performs this routine. This combiner may be a program module in the word processor, a separate utility in the operating system, or a separate program that interfaces with the word processor.

The routine begins with step 702, in which the stochastic input combiner parses the text selection into text components originating from different input sources. To do so, the stochastic input combiner consults the data structure that stores the source of each word in the text string displayed on the monitor 147. Parsing the text selection into text components makes the process of determining alternatives for the text selection more manageable.

One skilled in the art should recognize that multiple definitions of a text component are possible. Using a different definition than the embodiment described in FIGS. 7-9 will require a different parsing step 702, as well as other appropriate modifications of the routines described therein. A text component could, for example, be a single word. Or, a text component could be a phrase composed of words originating from the same input source. In the latter case, a phrase derived from a stochastic input source could be a different text component than an edit inserted into the middle of that phrase.

Figure 8:
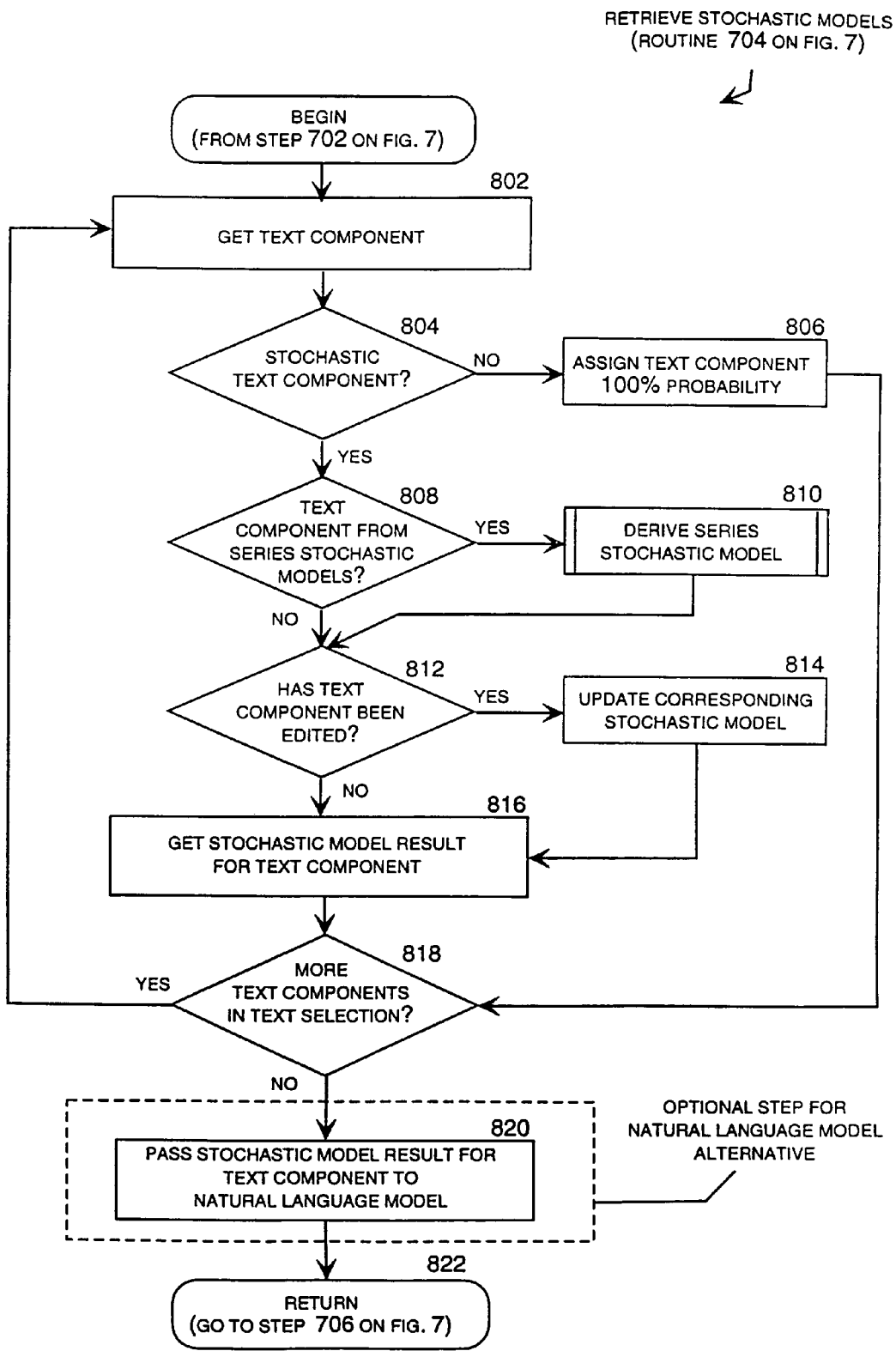
FIG. 8 is a flow chart of the steps in a routine for retrieving stochastic models for the text components in a text selection.
Figure 9:
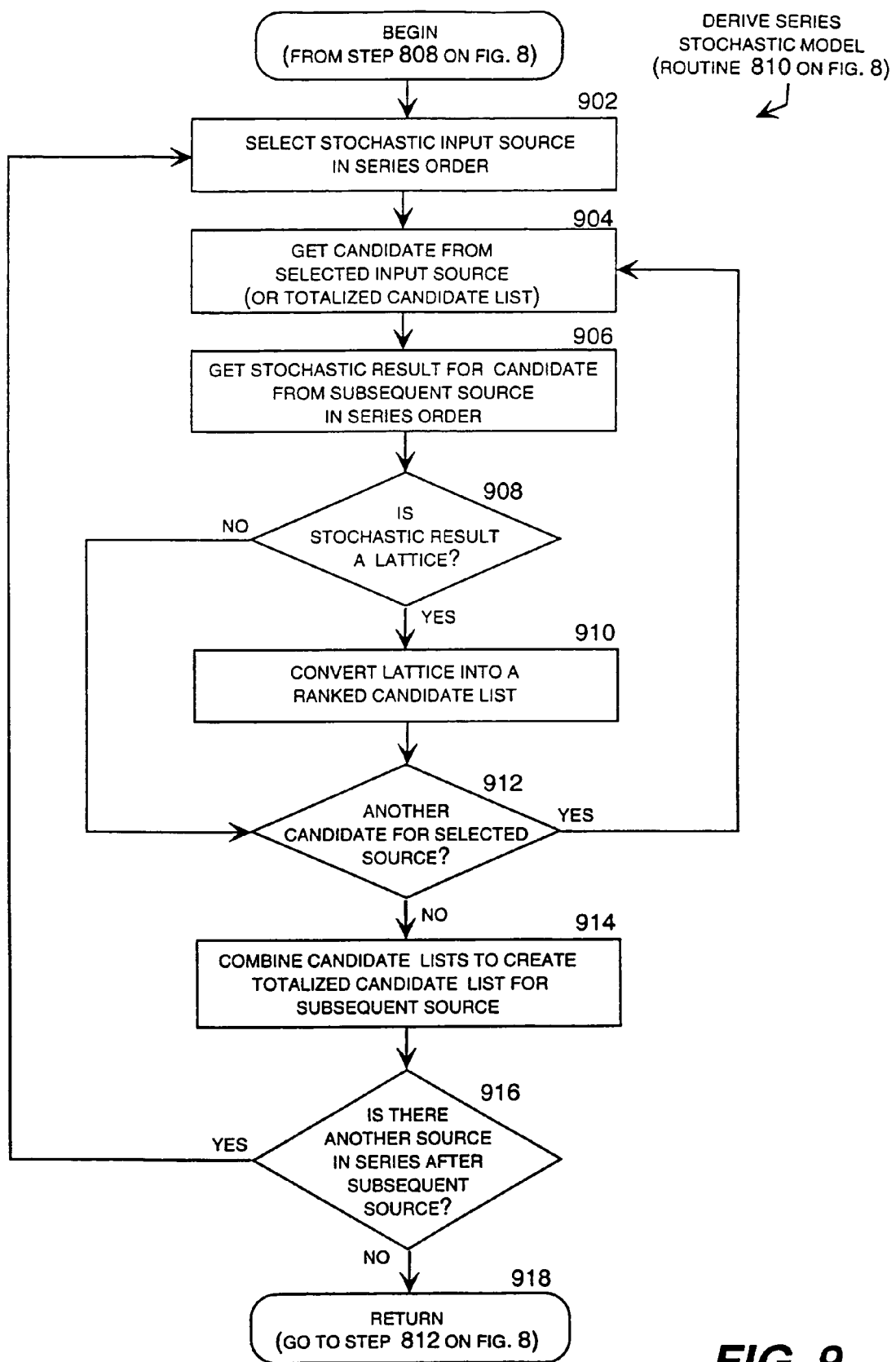
FIG. 9 is a flow chart of the steps in a routine for deriving a series stochastic model.

FIGS. 7-9 illustrate an example in which a text component is defined as the largest unit of text derived from a different input source or series of stochastic input sources than its neighbors, together with any typed text that has edited that text component. A unit of typed text that is not an edit of a text component originating from a stochastic input source is considered its own text component. For example, typed text a user has inserted between text components originating from different stochastic input sources is considered its own text component.

In step 704, the stochastic input combiner retrieves a stochastic model for each text component originating from a stochastic input source. In step 706, the stochastic input combiner determines if all stochastic models are lattices. If all stochastic models are lattices, then step 708 is performed.

In step 708, the stochastic input combiner concatenates all the lattices retrieved into a metalattice. In order to create the metalattice, the stochastic input combiner creates nodes to incorporate any typed text components for typed text that is not incorporated into a text component from a stochastic input source. Using lattice traversal methods well known to those skilled in the art, the stochastic input combiner traverses the metalattice to form a list of alternatives for the text selection in step 710. After step 710, control passes to step 716, which will be discussed after the "NO" path from step 706 is described.

Returning to step 706, if all stochastic models retrieved in step 704 are not lattices, then the stochastic input combiner performs step 712. In this case, at least one of the stochastic models is an "n-best" candidate list. So, the stochastic input combiner converts each of the lattices into an "n-best" candidate list. This is necessary for the stochastic input combiner to perform step 714.

In step 714, the stochastic input combiner combines the "n-best" candidate list for each of the text components with typed text components in order to form a combined list of alternatives for the text selection. The stochastic input combiner does this by forming all possible combinations of alternatives, one from each "n-best" candidate list for a text component. For each combination, the stochastic input combiner arranges the alternatives for the text components in the order in which the text components appear in the text selection. The list of all arrangements thus formed comprises the list of alternatives for the text selection. After step 714, control passes to step 716.

Once control passes to step 716 from either 710 or 714, the stochastic input combiner has formed a list of alternatives for the text selection. Step 716 is an optional step in which a natural language model is operative. If this step is performed, the stochastic input combiner submits the list of alternatives for the text selection to the natural language model.

If optional step 716 is performed, then optional step 718 is also performed. In that step, the natural language models returns a ranked list of revised alternatives to the stochastic input combiner. The revised list includes a re-evaluation of the probabilities of the alternatives in the list of alternatives submitted to the natural language model. The revised list may also contain new alternatives for the text selection that the natural language model formed. The natural language model creates this revised list using natural language principles, including an analysis of grammatical and other language clues that the natural language model applies to the text selection as a whole.

In step 720, the stochastic input combiner chooses the top ranked alternatives for display. If optional steps 716 and 718 were performed, then the stochastic input combiner chooses these alternatives from the revised list received from the natural language model. If not, then the stochastic input combiner chooses these alternatives from the list of alternatives that were created by either step 710 or step 714. After step 720, the routine ends at step 722.

FIG. 8 shows the steps of routine 704 on FIG. 7. The routine illustrates the steps the stochastic input combiner follows to retrieve a stochastic model for each text component of the text selection originating from a stochastic input source. The routine begins at step 802, which effectively forms a loop for processing each text component. In step 802, the stochastic input combiner retrieves a text component. In step 804, the stochastic input combiner determines if that text component is a stochastic text component. If the retrieved component is not a stochastic text component, then step 806 is performed. In this case, the text component typically comprises typed text entered using a keyboard and mouse. Because the text component is non-stochastic, the stochastic input combiner assigns the text component a 100% probability. The stochastic input combiner then performs step 818, which shall be discussed shortly.

Returning to step 804, if the stochastic input combiner determines that the text component retrieved in step 802 is stochastic, then the stochastic input combiner performs step 808. In step 808, the stochastic input combiner determines if the text component is derived from stochastic models configured in series. If the text component is derived from a series of stochastic input sources, then the stochastic input combiner performs routine 810 in order to derive a series stochastic model that accurately represents the probabilities of the results produced by the last stochastic input source of the series. After routine 810, the stochastic input combiner performs step 812. Likewise, if the stochastic input combiner determines in step 808 that the text component retrieved in step 802 is not derived from a series of stochastic models, step 812 is performed.

In step 812, the stochastic input combiner determines if the user has edited the text component using a keyboard and mouse. If the text component has been edited, then the stochastic input combiner updates the corresponding stochastic model in step 814. If the stochastic model is a lattice, then updating it will include deleting any nodes corresponding to words that have been deleted from the text component. Furthermore, the stochastic input combiner must add nodes for new words within the text component. Similarly, if the stochastic model is an "n-best" candidate list, the stochastic input combiner must update each alternative of the list to remove words that have been deleted from the text component and add words that have been inserted into the text component.

After step 814, the stochastic input combiner performs step 816. The stochastic input combiner also performs step 816 if it determines in step 812 that the user has not edited the text component. In step 816, the stochastic input combiner retrieves a stochastic model result for the text component that was selected in step 802. If the text component was derived from a series of stochastic models, then the stochastic model retrieved is the series stochastic model produced in step 810 or, if the text component has been edited, the series stochastic model that was updated in step 814. The stochastic model retrieved may be a lattice or an "n-best" candidate list. The stochastic model retrieved need only contain information about the selected text component, so the stochastic input combiner may retrieve the stochastic model from a larger stochastic model for a selection of text that includes the text component.

The text component that was selected in step 802 may be derived from stochastic input, but a stochastic model representing alternatives for that text component may be unavailable. In that case, the text component can be treated the same as a non-stochastic text component. In other words, the stochastic input combiner assigns the known alternative for the text component a probability of 100%. After step 816, the stochastic input combiner performs step 818.

Step 818 can be reached from either step 816 or step 806. In this step, the stochastic input combiner determines if there are any more text components in the text selection to process. If there are any more text components, then the routine loops to step 802 so the stochastic input combiner can get and process the next text component.

When there are no more text components to process in step 818, the stochastic input combiner optionally performs step 820 for incorporating the natural language model. In this step, the stochastic input combiner passes each stochastic model retrieved for a text component to the natural language model. The natural language model applies natural language principles to the text components and returns them to the stochastic input combiner. Because the natural language model operates on individual text components in step 820, instead of on the entire text selection, step 820 may be performed either instead of steps 716 and 718, or in addition to those steps. After step 820, the routine ends at step 822.

FIG. 9 illustrates the steps of routine 810 on FIG. 8. This routine describes the steps the stochastic input combiner follows to derive a series stochastic model for a text component produced by stochastic input sources configured in series.

The routine 810 begins with step 902, which effectively begins a loop for processing in series order each of the stochastic input sources, except the last stochastic input source of the series. The first time the stochastic input combiner performs step 902, the stochastic input combiner selects the first stochastic input source in series order. This is the stochastic input source that receives the user input that ultimately produces the text component.

Because a stochastic input source produces multiple alternative results, the first stochastic input source produces multiple candidates for input into the second stochastic input source in the series. If the stochastic input combiner is not performing step 902 for the first time, then the stochastic input combiner will have produced a totalized candidate list in step 914 (to be described shortly) for the stochastic input source selected in step 902. In the latter case, the totalized candidate list contains the alternatives associated with the selected stochastic input source that are to be used as input into the subsequent stochastic input source of the series. Step 904 effectively begins a loop for processing all of the candidates associated with the selected stochastic input source. In step 904, the stochastic input combiner retrieves one of the candidates for the selected input source.

In step 906, the stochastic input combiner submits the candidate retrieved in step 904 as input into the subsequent stochastic input source in series order. Inputting this candidate into the subsequent stochastic input source produces a stochastic result because the subsequent source is also stochastic. The stochastic input combiner retrieves this stochastic result.

In step 908, the stochastic input combiner determines if the stochastic result retrieved in step 906 is a lattice. If the stochastic result retrieved in step 906 is not a lattice, then it is a ranked candidate list and step 912 (to be discussed shortly) is performed. If the stochastic result retrieved in step 906 is a lattice, then the stochastic input combiner must convert the lattice into a ranked candidate list of alternatives, with each alternative having an associated probability. This is done in step 910 before control passes to step 912.

In step 912, the stochastic input combiner determines if there is another candidate for the selected source. If there is another candidate for the selected source, then the routine loops back to step 904 so that the stochastic input combiner can get the next candidate. If there is not another candidate for the selected source, then step 914 is performed.

In step 914, the stochastic input combiner combines all the candidate lists produced by using candidates from the input source selected in step 902 as input into the subsequent stochastic input source in series order. This combination forms a totalized candidate list for the subsequent stochastic input source. The stochastic input combiner forms the totalized candidate list by making one entry for each unique candidate in the candidate lists being combined. Then, the stochastic input combiner calculates a probability for each alternative in the totalized alternatives list by summing all probabilities assigned to that alternative in each of the candidate lists being combined. The stochastic input combiner assigns each calculated probability to its associated alternative.

In step 916, the stochastic input combiner determines if there is another source in the series after what is currently the subsequent source. If there is another source in the series, then the stochastic input combiner selects what is currently the subsequent source in step 902, and the next source after what had been the subsequent source becomes the subsequent source. At this point, the stochastic input combiner chooses candidates from the totalized candidate list for the selected input source as input into the subsequent stochastic input source.

Returning to step 916, if there is not another source in the series after the subsequent source, then the routine ends at step 918. The totalized candidate list most recently created in step 914 is selected as the series stochastic model.

Figure 10:
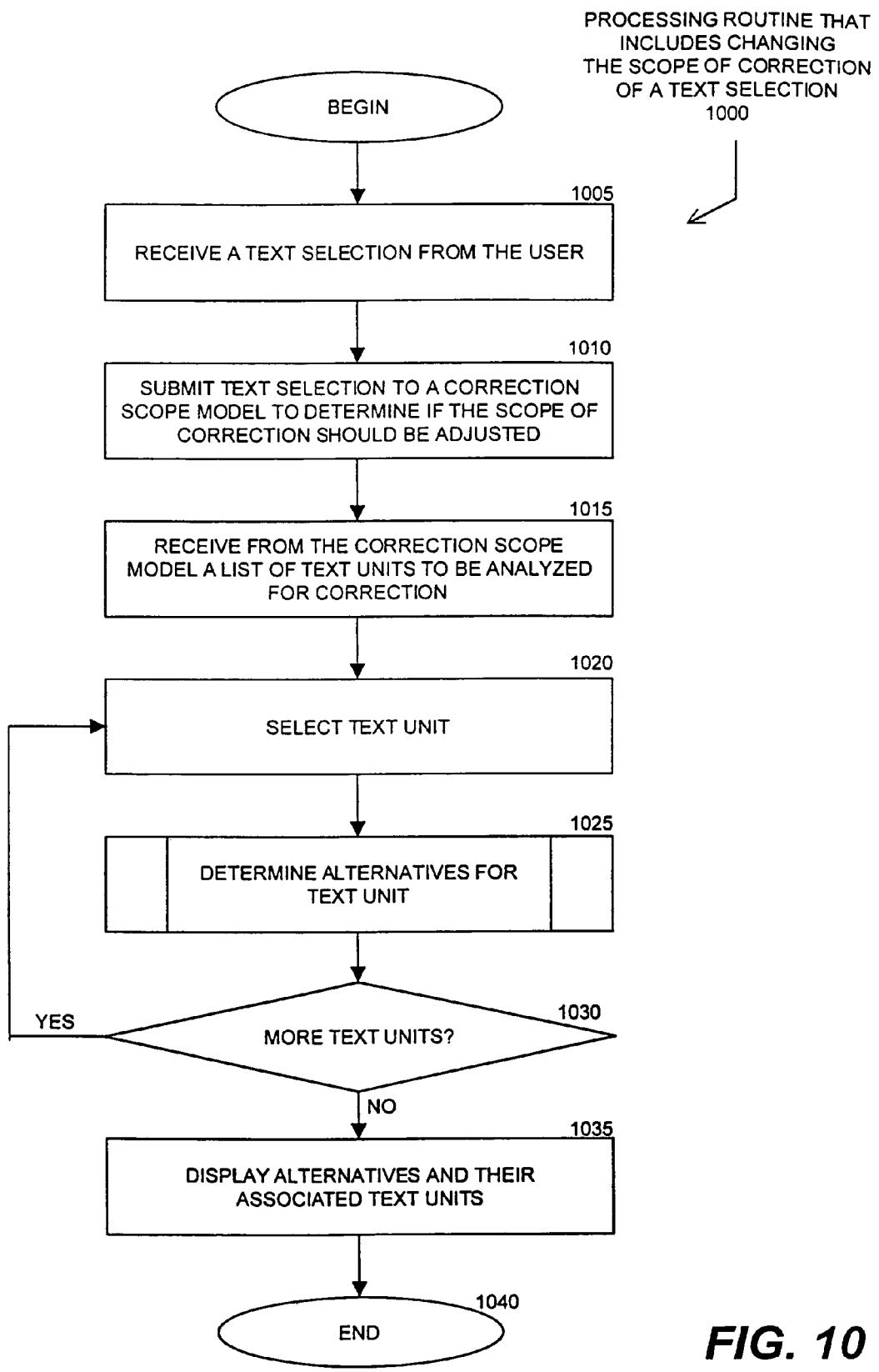
FIG. 10 is a flow chart of the steps in an alternative routine for processing source data that includes changing the scope of correction of a text selection.

FIG. 10 is a logical flow diagram illustrating typical steps of an alternative embodiment 1000 of a source data processing routine. Generally, the routine provides for automatically adjusting the unit of text corrected in response to a user's text selection.

Routine 1000 begins with step 1005. In that step, the word processor 210 receives a text selection from the user which the user wants to correct. The user may specify the text selection by selecting the word or group of words comprising the text selection with the mouse 142. Alternatively, the user may specify a text selection consisting of a single word by using the mouse 142 to place the insertion point in or adjacent to the word. The word processor 210 may then submit the text selection to the stochastic input combiner 137 to determine correction alternatives.

In step 1010, the stochastic input combiner 137 submits the text selection to a correction scope model to determine if the scope of correction should be adjusted. Typically, adjusting the scope of correction involves identifying a text unit that will provide better text correction alternatives to the user than the text selection alone. For instance, the text selection may not include neighboring words that also contain errors which could be corrected together with the text selection. Usually, such errors in words neighboring a user's text selection are identifiable because they relate to errors in the text selection.

Accordingly, a text unit identified by the correction scope model may include the text selection plus one or more adjacent words. Instead of identifying only a single text unit for possible correction, the correction scope model may identify multiple text units, each of which are likely to yield good alternatives for text correction.

In step 1015, the stochastic input combiner 137 receives from the correction scope model a list of text units for which correction alternatives should be provided to the user. If the correction scope model determined that the scope of correction need not be adjusted, then the list of text units includes only the text selection. If the correction scope model identified only one text unit for correction, the list of text units need include only that one text unit.

Step 1020 effectively begins a loop for processing each of the text units identified in the list of text units that the correction scope model returned to the stochastic input combiner 137 in step 1015. In step 1020, the combiner 137 selects a text unit for processing. In step 1025, the combiner 137 performs the steps of the routine of FIG. 7 in order to determine alternatives for the selected text unit. One should understand that when the combiner 137 performs the routine 1025 by performing the steps described in FIG. 7, "text selection" as used in FIG. 7 refers to the selected text unit.

In step 1030, the stochastic input combiner 137 determines if there are any more text units to process. If there are more text units, the routine loops back to step 1020 along the "YES" branch to process the next text unit. If there are no more text units, the "NO" branch is followed to step 1035.

In step 1035, the stochastic input combiner 137 provides each of the correction alternatives and their associated text units to the word processor 210 for display. The word processor 210 may display these alternatives in any appropriate manner. If the scope of correction was not adjusted, the alternatives may be displayed as described with respect to FIG. 6. If the combiner 137 expanded the scope of correction to a single text unit, the word processor 137 may highlight the additional words in the text to which the scope of correction was expanded in a different color than the color used to highlight the text selection, and the word processor may present the alternatives for the text unit in a typical graphical user interface as described with respect to FIG. 6.

Suppose that the correction scope model identified multiple text units for correction. In that case, the word processor 210 may present the user with a menu of alternatives and identify the corresponding text unit for each alternative.

After the word processor 210 presents the correction alternatives to the user through a graphical user interface, the routine ends at step 1040. The word processor 210 can then process the user's response to the alternatives as described with respect to FIG. 6.

CONCLUSION

Other alternative embodiments will become apparent to those skilled in the art to which an exemplary embodiment pertains without departing from its spirit and scope. Accordingly, the scope of the present invention is defined by the appended claims rather than the foregoing description.

The invention claimed is:

1. A computer-implemented method for correcting text, comprising the steps of:

receiving a text selection comprising a plurality of text components derived from different input sources, wherein at least one of the text components comprises a stochastic text component derived from a stochastic input source;

receiving a command to display alternatives for the text selection;

parsing the text selection into the text components;

retrieving the stochastic model for the stochastic text component from the at least one stochastic input source;

combining the stochastic model with other text components to produce a list of alternatives for the text selection, wherein the other text components include non-stochastic text components received from a non-stochastic input source; and displaying the list of alternatives for the text selection on a display device, wherein the text selection comprises a plurality of stochastic text components and one of the stochastic models comprises an "n-best" candidate list and another stochastic model comprises a lattice, and wherein the step of combining the stochastic models to produce a list of alternatives for the text selection further comprises the steps of:

creating an "n-best" candidate list corresponding to the lattice; and producing the list of alternatives for the text selection by combining the "n-best" candidate lists for the text components.

2. The method of claim 1, further comprising the steps of:
receiving a user command selecting one of the displayed alternatives; and
replacing the text selection with the selected alternative.

3. The method of claim 1, further comprising the steps of:
receiving an edit to the text selection;
producing a revised list of alternatives for the edited text selection; and
displaying the revised list of alternatives for the edited text selection.

4. The method of claim 1, further comprising the steps of:
receiving an edit to one of the stochastic text components;
retrieving a revised stochastic model for the edited stochastic text component from its associated stochastic input source or series of input sources;
combining the revised stochastic model with another stochastic model associated with the text selection to produce a revised list of alternatives for the edited text selection; and
displaying the revised list of alternatives for the edited text selection.

5. The method of claim 1, wherein the text selection comprises a portion of text in a file within an application selected from the group consisting of a word processor, a spreadsheet, a browser, an electronic mail program, a music transcription program, a CAD program, a presentation program, and an operating system.

6. The method of claim 1, wherein the step of displaying the alternatives for the text selection further comprises the steps of:
ranking the alternatives for the text selection in probability order; and
displaying the alternatives in their rank order on the display device.

7. The method of claim 6, wherein the step of displaying the alternatives in their rank order further comprises the steps of:
selecting a pre-determined number of highest ranked alternatives; and
displaying the selected alternatives in their rank order on the display device.

8. The method of claim 1, wherein the text selection comprises a plurality of stochastic text components and the step of combining the stochastic models further comprises the steps of:
combining the stochastic models for each stochastic text component to produce an interim list of alternatives for the text selection;
providing the interim list of alternatives to a natural language model;
receiving a revised list of alternatives for the text selection from the natural language model, the revised list of alternatives comprising a reevaluation of the interim list of alternatives based on natural language principles applied by the natural language model to the text selection as a whole; and
displaying the revised list of alternatives as the list of alternatives for the text selection.

9. The method of claim 8, wherein the revised list of alternatives also comprises additional alternatives formed by the natural language model that are not found in the interim list of alternatives provided to the natural language model.

10. The method of claim 8, further comprising the step of providing the stochastic model retrieved for one or more stochastic text components to a natural language model for reevaluation based on natural language principles.

11. The method of claim 8, further comprising the step of providing the stochastic model for each stochastic text component to the natural language model for use in creating the revised list of alternatives.

12. The method of claim 1, wherein the text selection comprises a plurality of stochastic text components and the stochastic models for the text components comprise lattices, and wherein the step of combining the stochastic models to produce a list of alternatives for the text selection further comprises the steps of:
concatenating the lattices into a metalattice that includes information about any text components that are derived from a non-stochastic source; and
producing the list of alternatives for the text selection from the metalattice.

13. The method of claim 1, wherein the step of retrieving a stochastic model for a text component originating from a stochastic input source further comprises the steps:
determining if the text component is derived from stochastic input sources configured in series;
if the text component is derived from stochastic input sources configured in series, deriving a series stochastic model by combining together a stochastic model from each stochastic input source in the series; and
retrieving the series stochastic model as the stochastic model for the text component.

14. The method of claim 1, wherein the stochastic text component is derived from at least two stochastic different input sources.

15. The method of claim 14, wherein one of the at least two stochastic input sources includes speech and another of the at least two stochastic input sources includes handwriting.

16. A computer-readable medium having computer-executable instructions for performing the method of claim 1.

17. A computer adapted to perform the method of claim 1.

18. A computer-implemented method for correcting text, comprising the steps of:
receiving a text selection from a user;
receiving a command to display alternatives for the text selection;
submitting the text selection to a correction scope model to determine if a scope of correction should be adjusted;
if the correction scope model determines the scope of correction should be adjusted, then receiving from the correction scope model a text unit that includes the text selection and at least one adjacent word;
producing a list of alternatives for the text unit wherein the step of producing a list of alternatives for the text unit further comprises the step of:
parsing the text unit into text components derived from different input sources;
determining whether at least one of the text components comprises a stochastic text component;
retrieving a stochastic model for the stochastic text component;
combining the stochastic model with other text components, wherein the other text components include non-stochastic text components received from a non-stochastic input source; and
displaying the list of alternatives for the text unit on a display device, wherein the text selection comprises a plurality of stochastic text components and one of the stochastic models comprises an "n-best" candidate list and another stochastic model comprises a lattice, and wherein the step of combining the stochastic models to produce a list of alternatives for the text selection further comprises the steps of:
creating an "n-best" candidate list corresponding to the laffice; and producing the list of alternatives for the text selection by combining the "n-best" candidate lists for the text components.

19. The method of claim 18, further comprising the steps of:
receiving a user command selecting one of the displayed alternatives; and
replacing the text unit with the selected alternative.

20. The method of claim 18, wherein the adjacent word is incorrect because of a related error that caused a word within the text selection to be incorrect.

21. The method of claim 18, wherein the correction scope model includes criteria selected from the group consisting of a natural language model, a model of likely errors, an acoustic model, a handwriting model, and a vision-based model.

* * * * *